Sept. 26, 1939.  H. J. DUNKELOW  2,174,317
CLUTCH
Filed Sept. 18, 1937
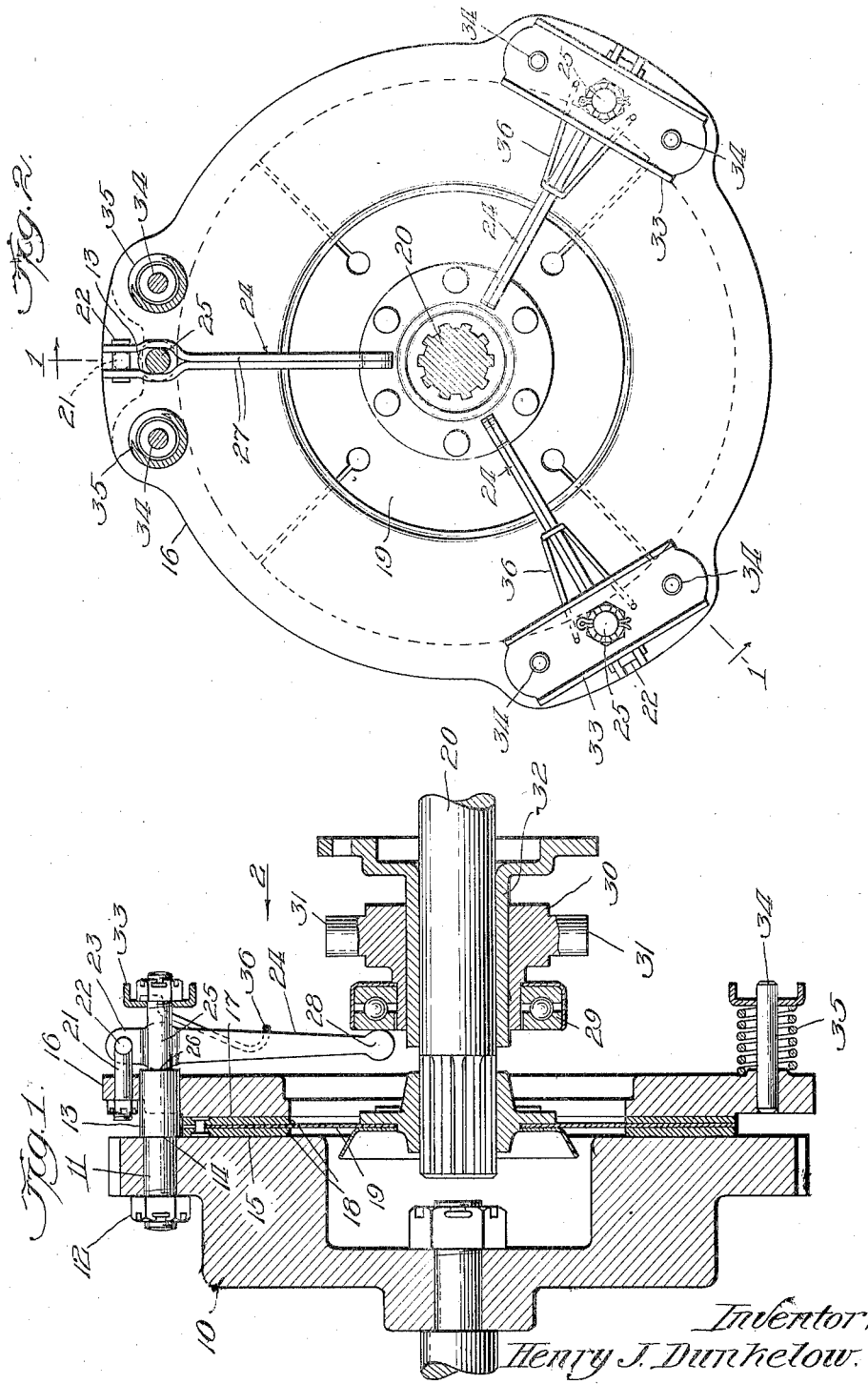
Inventor:
Henry J. Dunkelow.
by Davis, Lindsey, Smith & Shonts
Attys.

Patented Sept. 26, 1939

2,174,317

UNITED STATES PATENT OFFICE 2,174,317

CLUTCH

Henry J. Dunkelow, Racine, Wis., assignor to Twin Disc Clutch Company, Racine, Wis., a corporation of Wisconsin Application September 18, 1937, Serial No. 164,430

8 Claims. (Cl. 192—68)

My invention relates to clutches and more particularly to those of the spring loaded type.

The principal object of my invention is to devise a clutch in which the major operating elements, including the clamping plate, are supported directly or indirectly through the plate by the devices which drivably connect the plate to a rotary part constituting one of the members of the clutch.

A further object is to provide a clutch in which the clamping plate and the associated elements are arranged for easy and rapid attachment to and detachment from a flywheel or other rotary part, thus facilitating repair and replacement of the component elements.

These and further objects of my invention will be set forth in the following specification, reference being had to the accompanying drawing, and the novel means by which said objects are effectuated will be definitely pointed out in the claims.

In the drawing:

Figure 1 is a sectional elevation of my improved clutch taken along the line 1—1 in Fig. 2, looking in the direction of the arrows.

Fig. 2 is an end view of the clutch, partly in section, as viewed in the direction of the arrow 2 in Fig. 1.

Referring to the drawing, the numeral 10 designates one of the rotary parts constituting one of the members of the clutch and, for convenience, this member will be regarded as a flywheel and the driving member of the structure hereinafter described. A plurality of studs 11 are mounted in the flywheel adjacent the periphery thereof and are equi-spaced circumferentially around the flywheel. These studs project through the left face of the flywheel, as viewed in Fig. 1, and are engaged by nuts 12 which hold the studs securely against endwise movement. On the right side of the flywheel, the studs are enlarged as at 13 and this enlarged portion forms a shoulder 14 which abuts against the right face of the flywheel designated generally by the numeral 15. In the present instance, three studs 11 are employed, but the number of these elements may be varied as desired.

The enlarged stud portion 13 projects freely through a clamping plate 16 so that the studs have a driving and supporting relation to the plate, while the latter may be freely shifted axially therealong in order to engage and disengage the clutch parts presently described. The plate 16 is provided with a face 17 which, together with the flywheel face 15, frictionally engages facings of frictional material, designated by the numeral 18, which are secured to opposite sides of the friction plate 19. This plate is mounted to partake of the rotary motion of the driven shaft 20 and also to be shiftable axially therealong to provide for engaging and disengaging the clutch.

Outwardly of each stud 11, the shank of a T-bolt 21 is mounted in the clamping plate 16 and freely pivoted on the wings 22 of each bolt are the bifurcated ends 23 of an operating lever 24. The lever ends 23 straddle a reduced portion 25 of the adjacent driving stud 11 and this reduced portion forms with the stud portion 13 a shoulder 26 whose function in the general arrangement will be hereinafter described. In the structure as illustrated, each operating lever 24 is indicated as being composed of two parts 27 which may be appropriately secured together inwardly of the driving studs, as by welding, and which parts are spaced from each other adjacent their outer ends in order to straddle the driving studs and effect pivotal connection with the limbs of the T-bolts 21. Other lever constructions may be adapted as desired.

The inner end of each lever 24 is shaped as a nose 28 which contacts one race of a ball bearing 29 that is mounted on an operating collar 30 having the usual trunnions 31 which are engaged by a shifting fork (not shown). The collar 30 is slidably mounted on a sleeve 32 within which rotates the shaft 20.

As indicated in Fig. 1, the right end of each driving stud 11 extends beyond the associated operating lever 24 and has mounted thereon an abutment plate 33 which extends in opposite directions from the stud 11 and substantially at right angles to the adjacent lever 24. Adjacent the extremities of each plate 33 is a pin 34 which extends through the plate and is mounted in the clamping plate 16. A loading spring 35 encircles each pin 34 between the abutment plate 33 and the adjacent surface of the clamping plate 16. In the driving position of the clutch, as illustrated in Fig. 1, the springs 35 apply loading pressure to the clamping plate in the usual manner, and it will be particularly noted that these springs are arranged in groups of two around the clamping plate, with the springs of each group symmetrically located with respect to the adjacent operating lever 24.

The clutch may be easily disengaged by shifting the operating collar 30 towards the left, from the position illustrated in Fig. 1, thus moving the lever noses 28 towards the clamping plate and causing the bifurcated ends of each lever to fulcrum against the shoulder 26 and thereby shift the clamping plate 16 towards the right against the compression of the loading springs 35. When the operating collar 30 is shifted to the position illustrated in Fig. 1, the loading springs 35 automatically return the clamping plate to the position illustrated in Fig. 1, i. e., in which the friction plate 19 is securely gripped in driving engagement between the opposing faces of the flywheel and the clamping plate. If desired, U-shaped spring members 36 may have the ends of their limbs fastened to each abutment plate 33, with their closed ends bearing against the clutch levers inwardly of the driving studs, the spring members being shaped and arranged so as to cause the bifurcated end of each lever to bear against the adjacent shoulder 26 when the clutch is in driving position, thereby preventing any rattling action of the levers during the rotation of the clutch.

The provision of the driving studs 11 which are permanently mounted in the flywheel and which not only drivably connect the clamping plate to the flywheel, but also support the plate and the associated operating mechanisms, provides a very convenient attaching medium for the clamping plate and enables the latter to be mounted bodily on the studs or removed bodily therefrom, as may be required from time to time for purpose of replacement and repair. The loading springs 35 compensate automatically for wear as the friction facings 18 become worn and the T-bolts 21 provide a means of adjustment during assembly of the clutch, and also for the same purpose when renewals or repairs become necessary.

I claim:

1. In a clutch, the combination of a clamping plate, pin means adapted for mounting in a rotary part constituting one of the members of the clutch and having driving and supporting connection with the plate, loading springs interposed between the plate and a part carried by the pin means and operating levers pivoted on the plate and adapted to fulcrum on the pin means for releasing the plate.

2. In a clutch, the combination of a clamping plate, pin means adapted for mounting in a rotary part constituting one of the members of the clutch and having driving and supporting connection with the plate, loading springs interposed between the plate, and a part carried by the pin means, bolts mounted on the plate, and an operating lever pivoted on each bolt and adapted to fulcrum on the associated pin means for releasing the plate.

3. In a clutch, the combination of a clamping plate, pin means adapted for mounting in a rotary part constituting one of the members of the clutch and having driving and supporting connection with the plate, loading springs interposed between the plate and a part carried by the pin means, adjustable bolts mounted on the plate, and an operating lever pivoted on each bolt and adapted to fulcrum on the associated pin means for releasing the plate.

4. In a clutch, the combination of a clamping plate, pin means adapted for mounting in a rotary part constituting one of the members of the clutch and having driving and supporting connection with the plate, loading springs interposed beween the plate and a part carried by the pin means, T-bolts having their shanks mounted in the plate, and a plurality of operating levers, each lever having its outer ends bifurcated for pivotal connection to the wings of a bolt, and an adjacent portion of each lever being adapted to fulcrum on the associated pin means for releasing the plate.

5. In a clutch, the combination of a clamping plate, pin means adapted for mounting in a rotary part constituting one of the members of the clutch and having driving and supporting connection with the plate, loading springs interposed between the plate and a part carried by the pin means, and a plurality of operating levers pivoted on the plate, each lever straddling one of the pin means and adapted to fulcrum against a shoulder provided thereon for releasing the plate.

6. In a clutch, the combination of a clamping plate, pin means adapted for mounting in a rotary part constituting one of the members of the clutch and having driving and supporting connection with the plate, loading springs interposed between the plate and a part carried by the pin means, T-bolts having their shanks mounted in the plate, and a plurality of operating levers, each lever having its outer end bifurcated for a pivotal connection to the wings of a bolt and straddling the adjacent pin means to fulcrum against a shoulder provided thereon for releasing the plate.

7. In a clutch, the combination of a clamping plate, pin means adapted for mounting in a rotary part constituting one of the members of the clutch and having driving and supporting connection with the plate, an abutment plate carried by each of the pin means, and springs interposed between the clamping and abutment plates for maintaining the driving position of the clutch, and operating levers pivoted on the clamping plate and adapted to fulcrum on the pin means for releasing the clamping plate.

8. In a clutch, the combination of a clamping plate, a plurality of pins adapted for mounting in a rotary part constituting one of the members of the clutch and having driving and supporting connection with the plate, an abutment plate carried by each pin, and a pair of springs interposed between the clamping and each abutment plate and located on opposite sides of the associated pin for maintaining the driving position of the clutch.

HENRY J. DUNKELOW.